T. WILSON & L. B. KENDALL.
Hose-Couplings.
No. 139,223.
Patented May 20, 1873.
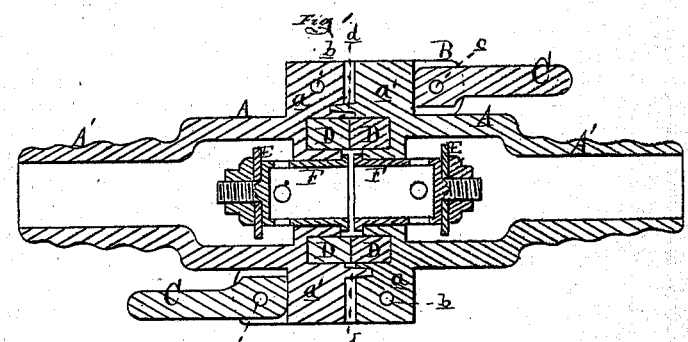
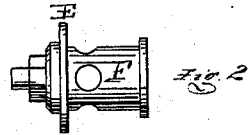
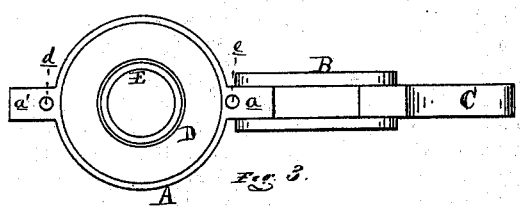

UNITED STATES PATENT OFFICE.

THOMAS WILSON AND LUCIUS B. KENDALL, OF KALAMAZOO, MICHIGAN.

IMPROVEMENT IN HOSE-COUPLINGS.

Specification forming part of Letters Patent No. 139,223, dated May 20, 1873; application filed April 2, 1873.

*To all whom it may concern:*

Be it known that we, THOMAS WILSON and LUCIUS B. KENDALL, of Kalamazoo, in the county of Kalamazoo and State of Michigan, have invented a new and useful Improvement in Hose-Couplings; and we do declare that the following is a true and accurate description thereof, reference being had to the accompanying drawing and to the letters of reference marked thereon and being a part of this specification, in which—

Figure 1 is a longitudinal section of a pair of our improved couplings coupled. Fig. 3 is an elevation of the face of the coupling. Fig. 2 is a side elevation of the valve in a coupling.

Like letters refer to like parts in each figure.

The nature of this invention relates to an improved form of coupling for joining lengths of hose together, wherein leakage is prevented by the compression of gaskets between the couplings.

The invention consists in the peculiar construction of a pair of face-couplings, which may be locked and compressed together by cams or eccentric levers; also, in providing each butt with a peculiar valve, so arranged that when said butts are coupled together the said valves will be open from their seats, and permit the flow of air or fluid through the line of hose, while as soon as the butts are uncoupled the valves will automatically close and prevent the escape of air or fluid from either section of hose.

In the drawing, A represents a butt or coupling, provided with a corrugated tail-piece, A', on which the end of the hose is bound. There are two lugs, $a\ a'$, projecting laterally at opposite sides of the end of the butt. To the lug $a$ a link, B, is pivoted at each side thereof by a pin, $b$. Between the outer ends of said links a cam-lever, C, is pivoted by a pin, $c$.

The couplings being precisely alike, a description of one will suffice for both.

At the base of one lug a dowel, $d$, projects from the face thereof, while in a corresponding position in the face of the other lug a dowel-socket, $e$, is drilled.

In the face of the coupling an annular recess is turned, which receives a rubber ring or gasket, D, which projects beyond the general plane of the butt. E is a valve-disk, which is secured by a screw-nut to the inner end of a valve-cylinder, F, which plays in an annular bearing formed by the bore of the coupling, which is enlarged behind the seat of the valve E. The outer end of the cylinder F has an outward flange, which limits the backward movement of the valve E from its seat. A series of openings is made through the wall of the cylinder as near the valve E as is practicable.

When two such couplings are brought together, the dowel of the one entering the dowel-socket of the other, and vice versa, brings their faces into the proper juxtaposition, so that the links of the one, with the cam-lever raised, as in Fig. 2, may be thrown over the stud $a$ of the other, and vice versa, when, if the levers C be thrown down to the position shown in Fig. 1, their cams acting upon the back edges of the opposing studs, the couplings will be drawn forcibly together, and so compress the gaskets D that no leakage can occur between their faces. When the couplings are brought together the meeting ends of the cylinders F force each other back, removing the valves E from their seats, while the openings $e$ are at the same time disclosed, thereby leaving the air or fluid free to flow through from one section of the hose to the other. If the hose be uncoupled, any internal pressure in either section thereof will seat the valve E and prevent the escape of air or fluid.

What we claim as our invention, and desire to secure by Letters Patent, is—

The described coupling, consisting essentially of the parts A, having recesses for the gasket D and united by links B, and eccentric lever C, in combination with the cylinder F, having the apertures $e$, as described, for the purpose set forth.

THOMAS WILSON.
LUCIUS B. KENDALL.

Witnesses:
AMOS D. ALLEN,
H. J. BROWNELL.